US010798422B2

United States Patent
Boyce

(10) Patent No.: US 10,798,422 B2
(45) Date of Patent: Oct. 6, 2020

(54) METHOD AND SYSTEM OF VIDEO CODING WITH POST-PROCESSING INDICATION

(71) Applicant: Intel Corporation, Santa Clara, CA (US)

(72) Inventor: Jill M. Boyce, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/099,506

(22) Filed: Apr. 14, 2016

(65) Prior Publication Data

US 2017/0111661 A1  Apr. 20, 2017

Related U.S. Application Data

(60) Provisional application No. 62/244,069, filed on Oct. 20, 2015.

(51) Int. Cl.
*H04N 19/85* (2014.01)
*H04N 19/44* (2014.01)
*H04N 19/70* (2014.01)

(52) U.S. Cl.
CPC ............ *H04N 19/85* (2014.11); *H04N 19/44* (2014.11); *H04N 19/70* (2014.11)

(58) Field of Classification Search
CPC .... H04N 19/85; H04N 19/117; H04N 19/635; H04N 19/29
USPC ....................... 375/240.26, 240.02
See application file for complete search history.

(56) References Cited

U.S. PATENT DOCUMENTS

| 9,736,507 | B2* | 8/2017 | Oh ................. H04N 21/234327 |
| 10,075,720 | B2 | 9/2018 | Tsukuba et al. |
| 2006/0176954 | A1 | 8/2006 | Lu et al. |
| 2010/0027624 | A1 | 2/2010 | Yu |
| 2012/0075436 | A1* | 3/2012 | Chen .................... H04N 13/161 348/51 |
| 2013/0064304 | A1* | 3/2013 | Lu .......................... H04N 19/42 375/240.25 |
| 2013/0314495 | A1 | 11/2013 | Chen et al. |
| 2014/0023138 | A1 | 1/2014 | Chen |
| 2014/0086333 | A1 | 3/2014 | Wang |
| 2014/0098851 | A1 | 4/2014 | Chen et al. |
| 2014/0327821 | A1 | 11/2014 | Chen et al. |
| 2015/0003749 | A1 | 1/2015 | Kim et al. |
| 2015/0189286 | A1 | 7/2015 | Salvucci |
| 2015/0245050 | A1 | 8/2015 | Tourapis et al. |
| 2015/0312584 | A1 | 10/2015 | Boyce |

(Continued)

FOREIGN PATENT DOCUMENTS

| CN | 1822666 | 8/2006 |
| CN | 101578877 | 11/2009 |

(Continued)

OTHER PUBLICATIONS

Fu, C.M., Chen, C.Y., Huang, Y.W. and Lei, S., Oct. 2011. Sample adaptive offset for HEVC. In Multimedia Signal Processing (MMSP), 2011 IEEE 13th International Workshop on(pp. 1-5). IEEE.*

(Continued)

*Primary Examiner* — Clifford Hilaire

(74) *Attorney, Agent, or Firm* — Green, Howard & Mughal LLP.

(57) ABSTRACT

Methods, systems, and articles are described herein related to video coding with post-processing indication.

23 Claims, 8 Drawing Sheets

(56) References Cited

U.S. PATENT DOCUMENTS

2016/0212437 A1* 7/2016 Tsukuba .................. H04N 19/30
2017/0085878 A1* 3/2017 Sole Rojals ......... H04N 19/124

FOREIGN PATENT DOCUMENTS

| CN | 103780914 | 5/2014 |
| CN | 104471942 | 3/2015 |
| CN | 104704843 | 6/2015 |
| CN | 104813671 | 7/2015 |
| EP | 0948207 | 10/1999 |
| TW | 201521427 | 6/2015 |
| WO | 2017053585 | 3/2017 |

OTHER PUBLICATIONS

Fu, C.M., Chen, C.Y., Huang, Y.W. and Lei, S., Oct. 2011. Sample adaptive offset for HEVC. In Multimedia Signal Processing (MMSP), 2011 IEEE 13th International Workshop on(pp. 1-5). IEEE. (Year: 2011).*

International Search Report & Written Opinion dated Jan. 4, 2017 for PCT Patent Application No. PCT/US16/52628.

Boyce, Jill, "Use of general_profile_space for auxiliary picture profile indication", Joint Collaborative Team on Video Coding (JCT-VC) of ITU-T SG 16 WP 3 and ISO/IEC JTC 1/SC 291WG 11, 18th Meeting: Sapporo, JP, Jun. 30-Jul. 9, 2014, 9 pages.

"High efficiency video coding", ITU-T H.265 Telecommunication Standardization Sector of ITU Series H: Audiovisual and Multimedia Systems Infrastructure of audiovisual services—Coding of moving video, (Apr. 2015), 634 pages.

Minoo, et al., "Description of the Exploratory Test Model (ETM) for HDR/WCG extension of HEVC", Joint Collaborative Team on Video Coding (JCT-VC) of ITU-T SG 16 WP 3 and ISO/IEC JTC 1/SC 29/WG 11, 23rd Meeting San Diego, USA, Feb. 19-26, 2016, 4 pages.

'High Efficiency Video Coding', https://en.wikipedia.org/wiki/High_Efficiency_Video_Coding, accessed May 10, 2016, 27 pages.

European Search Report for European Patent Application No. 16857966.2, dated May 10, 2019.

Ajay, L. et al., "Draft Requirements and Explorations for HDR/WCG Content Distribution and Storage", Motion Picture Expert Group (MPEG) Meeting, Jul. 6, 2014.

Sjoberg, et al., "HEVC High-Level Syntax", In High Efficiency Video Coding (HEVC): Algorithms and Architecures, Aug. 23, 2014.

Sullivan, G.J., "Ad Hoc Group Report: Layered coding constraint specifications and capability indications", Joint Collaborative Team on Video Coding of ISO/IEC JTC1/SC29/WG11 and ITU-T SG.16, Jun. 20, 2014.

Office Action for Chinese Patent Application No. 201680054360.7, dated Aug. 3, 2020.

Luthra, A.,"Draft Requirements and Explorations for HDR/WCG Content Distribution and Storage", 109.MPEG Meeting Jul. 7, 2014-Nov. 7, 2014; Sapporo; (Motion Picture Expert Group or ISO/IEC JTC1/SC29/WG11).

* cited by examiner

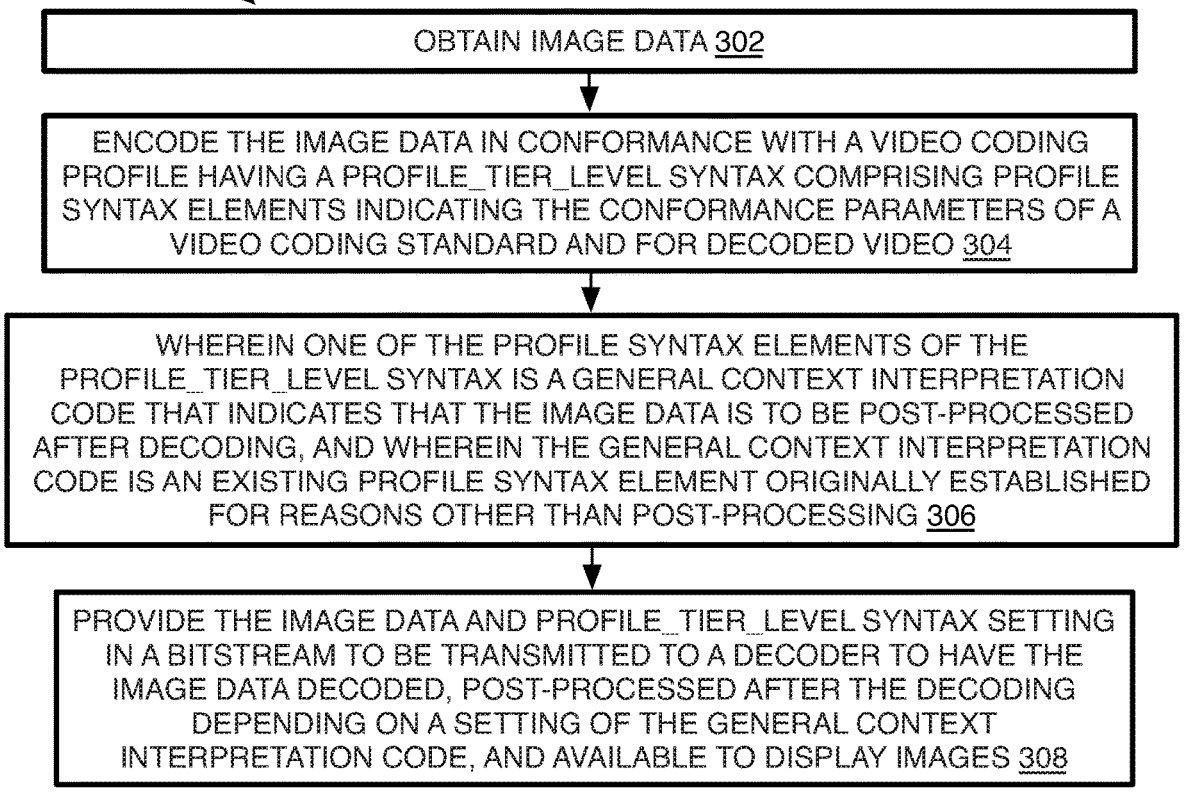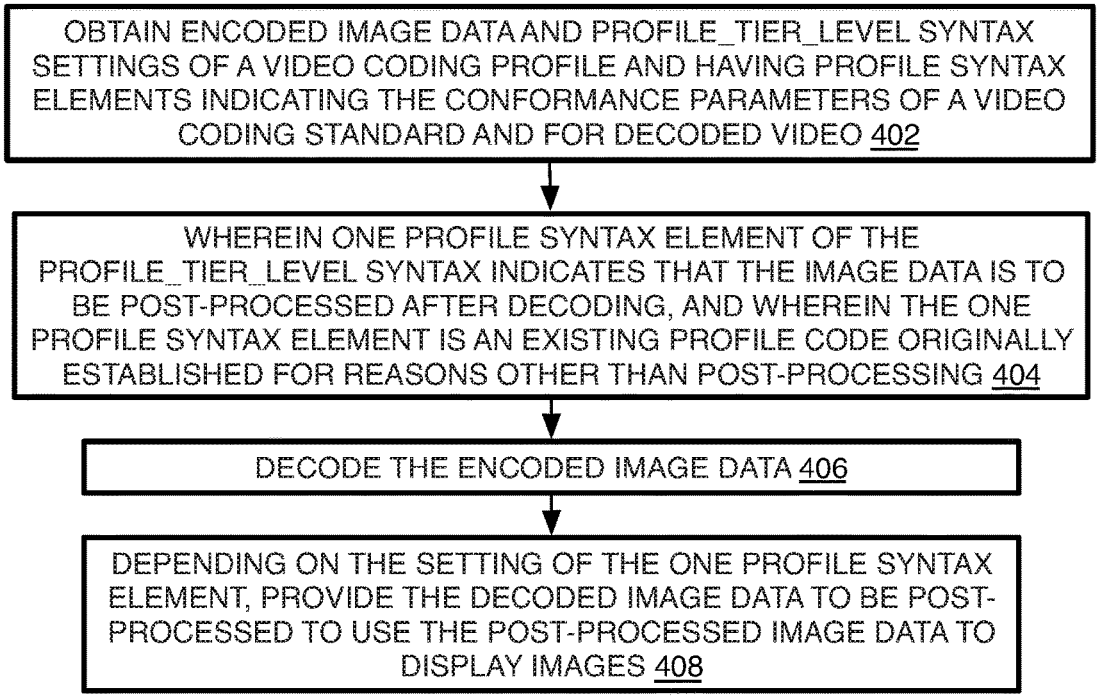

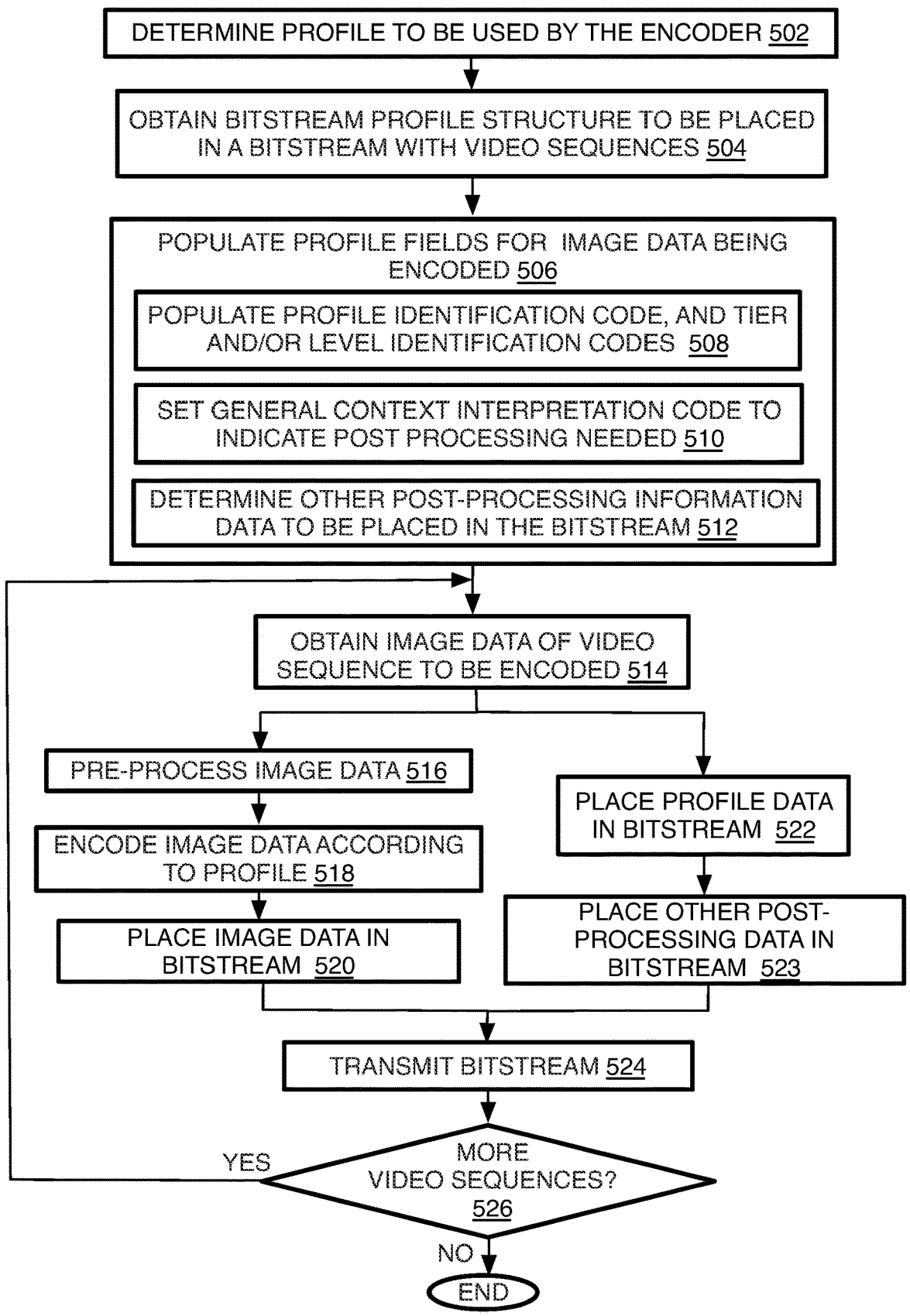

METHOD AND SYSTEM OF VIDEO CODING WITH POST-PROCESSING INDICATION

CROSS-REFERENCE TO RELATED APPLICATION

This application claims the benefit of U.S. Provisional Patent Application No. 62/244,069, filed Oct. 20, 2015, which is incorporated herein for all purposes.

BACKGROUND

Due to ever increasing video resolutions, and rising expectations for high quality video images, a high demand exists for efficient image data compression of video while performance is limited for coding with existing video coding standards such as H.265/HEVC (High Efficiency Video Coding) standard by ITU-T Rec. H.265, version 04/2013 from International Telecommunication Union, place des Nations, 1211 Geneva 20, Switzerland, and incorporated herein in its entirety. These standards use expanded forms of traditional approaches to address the insufficient compression/quality problem, but the results are still insufficient.

These typical video coding systems use an encoder that generates data regarding video frames that can be efficiently transmitted in a bitstream to a decoder and then used to reconstruct the video frames. This data may include video coding layer data such as the image luminance and color pixel values, as well as intra and inter prediction data, filtering data, residuals, and so forth so that the luminance and color data of each and every pixel in all of the frames need not be placed in the bitstream from encoder to decoder. The data also may include non-video coding layer data, or control data, that includes a profile that indicates the required capabilities of a decoder to properly decode the bitstream to the desired format and parameters of the image data once the image data is decoded, and can be easily used by a number of different display devices.

It also has been found that even though some video content is provided for display in very high quality formats such as High Dynamic Range (HDR), better coding efficiency is achieved to compress and transmit the image data by applying pre-processing functions including an adaptive transfer function (ATF) that changes the format of the image data to a format more suitable for HEVC compression, such as Standard Dynamic Range (SDR) to name one example. The pre-processing is reversed by an inverse post-processing function at the decoder to transform the decoded SDR video to HDR video content to provide the HDR video to a display for example. Also, there are other desirable pre-processing functions as well that require a forward pre-processing application that often needs to be reversed in a post-processing operation after decoding. The present HEVC standards, however, do not have sufficient implementations to require post-processing when a decoder receives video from an encoder with pre-processing capability to ensure that the resulting decoded video conforms to the correct format and parameters so that the video can be viewed in the high quality format.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 3 is a flow chart of a method of video coding with post-processing indication according to the implementations herein;

FIG. 4 is another flow chart of a method of video coding with post-processing indication according to the implementations herein;

FIG. 5A is a detailed flow chart of a method of video coding with post-processing indication according to the implementations herein;

DETAILED DESCRIPTION

Figure 1:
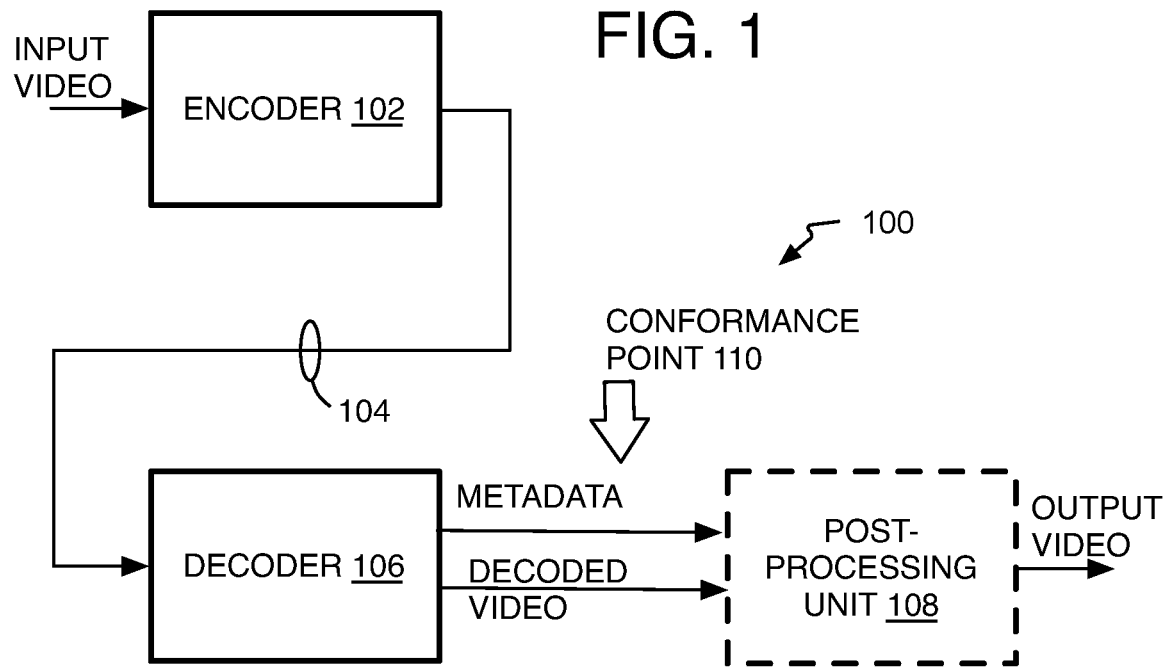
FIG. 1 is an illustrative diagram of a known video coding system.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, tablets, televisions, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof.

The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below related to video coding with post-processing indication according to the implementations herein.

Video compression of high dynamic range (HDR) content using the HEVC standard can achieve better coding efficiency when pre-processing is applied to convert the content using a transfer function prior to encoding and corresponding inverse post-processing is applied following decoding. In such a system, application of the post-processing function that inverses the pre-processing function may be required for acceptable video quality. The core encoding and decoding processes can be unchanged from existing profiles defined in HEVC even while performing this pre-processing and post-processing.

Profiles are signaled in sets of overhead data that are transmitted from an encoder and to a decoder to indicate the allowable parameters and format for a video sequence so that a decoder understands which coding algorithms must be supported to apply to the video bitstream to decode the video bitstream. In other words, the profile uses profile syntax elements (or generally referred to as profile indicator codes or profile indicators) in the profile_tier_level syntax associated with a defined set of coding tools that can be used to create a bitstream that conforms to that profile, and is defined by the specification of a video coding standard. An encoder assigned to a certain profile may choose which coding tools to use as long as it generates a conforming bitstream while a decoder for a profile must support all coding tools that can be used in that profile. The profile_tier_level syntax itself may include codes for levels and tiers to indicate capabilities that may vary or are a matter of degree from level to level or tier to tier such as resolution, frame rate, and so forth. The profile as described herein does not include other control data in the non-video coding layer (non-VCL) of a bitstream that is used to implement the features associated with the codes in the profile. For example, the parameters sets, SEI metadata, slice header data, and so forth are not considered part of the profile. In other words, the high level syntax (that describes the structure of the bitstream or provides information that applies to multiple pictures or to multiple coded block regions within a picture) includes more than just the profile. The details of profiles are explained in greater detail below.

Referring to FIG. 1, a conventional HEVC video compression or video coding system 100 is shown in which video is input to an HEVC encoder 102 which creates an HEVC bitstream 104. An HEVC decoder 106 decodes the bitstream to create decoded video. The point in the decoding process where the decoded video is established is considered a conformance point 110 such that all decoders which conform to the same profile, defined in the HEVC specification by one example, must be capable of decoding a bitstream conforming to that profile to create decoded video that is a bit-exact match to that created by a reference decoder operating as defined by the specification. So decoded and conformed, many different devices are able to use the decoded video data to display a video since its profile (or allowable parameters and/or format) is known. Thus, the "normal" conformance point is defined in the existing HEVC specification as the output of the decoder 106 (or "core" video decoder when a post-processing unit is considered part of the decoder). After decoding, the existing HEVC specification includes supplemental enhancement information (SEI) messages that recommend various post-processing functions. In the existing HEVC specification, the SEI message based post-processing functions are not normative (or in other words, are not required), and do not affect the definition of conformance of the decoder. FIG. 1 shows an optional post-processing unit 108 which receives metadata with SEI message-related data, and may post-process the decoded video according to those messages. Thus, in the conventional system, some decoders may decode video that was pre-processed even when no inversion post-processing is provided (and SEI messages are ignored in this case), or the decoder may not know the video is to be post-processed when the SEI metadata is dropped for example. Otherwise, even though a post-processing capable decoder receives SEI messages and understands that post-processing should be performed, the decoder still may omit the post-processing because the decoder does not have the capability to perform the recommended post-processing functionality.

When a pre-processed video bitstream is picked up by a decoder without post-processing, or does not know that the decoded video must be post-processed, the decoder may provide the video in the wrong or unexpected format, such as when HDR video is expected by a display but it receives video which had a transfer function applied instead. Moreover, more extreme problems exist, and in some cases, an adaptive transfer function (ATF) that changes the format of the video during pre-processing is not known, except through the parameters included in the bitstream, and if the inverse transfer function is not applied, the video cannot be properly viewed at all, e.g. the colors and brightness would be wrong.

Profiles do not currently provide a normative post-processing indicator. This allows for fewer profiles to be defined, which encourages interoperability. Hardware implementations benefit from having a few widely deployed profiles rather than a large number of niche profiles, because of significant development costs to design a hardware decoder which conforms to a particular profile.

One way to resolve this issue would be to define new additional profiles which otherwise duplicate the existing profiles except for adding the post-processing capability by adding a new post-processing field with a code that indicates that post-processing is to be applied and the type of post-processing. Each video coding standard has a list of available profiles where each profile indicates the use of certain capabilities such as bit depth, chroma sampling format, coding tools used, and many others. The use of profiles provides significant adaptability so that an encoder and decoder can code videos with different formats to increase efficiency and quality of the images. However, once a profile is defined in a standard, no changes can be made to that particular profile. If changes were allowed to add post-processing profile codes, legacy implementations that conform to that profile would no longer work. On the other hand, it still is desirable to reuse the legacy hardware decoder implementations that conform to a particular profile, even when post-processing is required.

To better resolve these issues, the disclosed methods herein reuse (or adapt) the existing profile signaling so that certain existing profile syntax elements, plus additional signaling in the profile_tier_level syntax, indicate that legacy decoder implementations that conform to specific profiles within a system includes the post-processing capability. It avoids the need to define additional profiles. Thus, conceptually speaking, this method effectively enables signaling to indicate that the conformance point of a decoding system is the output of a normative post-processing function which follows a core decoder of an existing profile (as implemented in a legacy decoder) and for known standards such as HEVC.

By one approach, this is accomplished by using a general context interpretation code in the profile_tier_level syntax of one of the video coding standards and that is conventionally set to 0 so that a bitstream of a coded video sequence (CVS) including the profile data is decoded, but the CVS may not be decoded if the general context interpretation code is other than 0. Conventionally, these values are reserved for future standardization use such as the addition of a new specification (or new set of profiles). The available settings for the general context interpretation code is changed herein to accept two values (such as 0 and 1) for decoding. When the general context interpretation code is set to 1 at an encoder and transmitted with image data to be decoded, legacy decoders modified to recognize 1 (or other value), may provide core decoding of the data according to the particular profile being used and the normative post-processing. The details are explained below.

Figure 2:
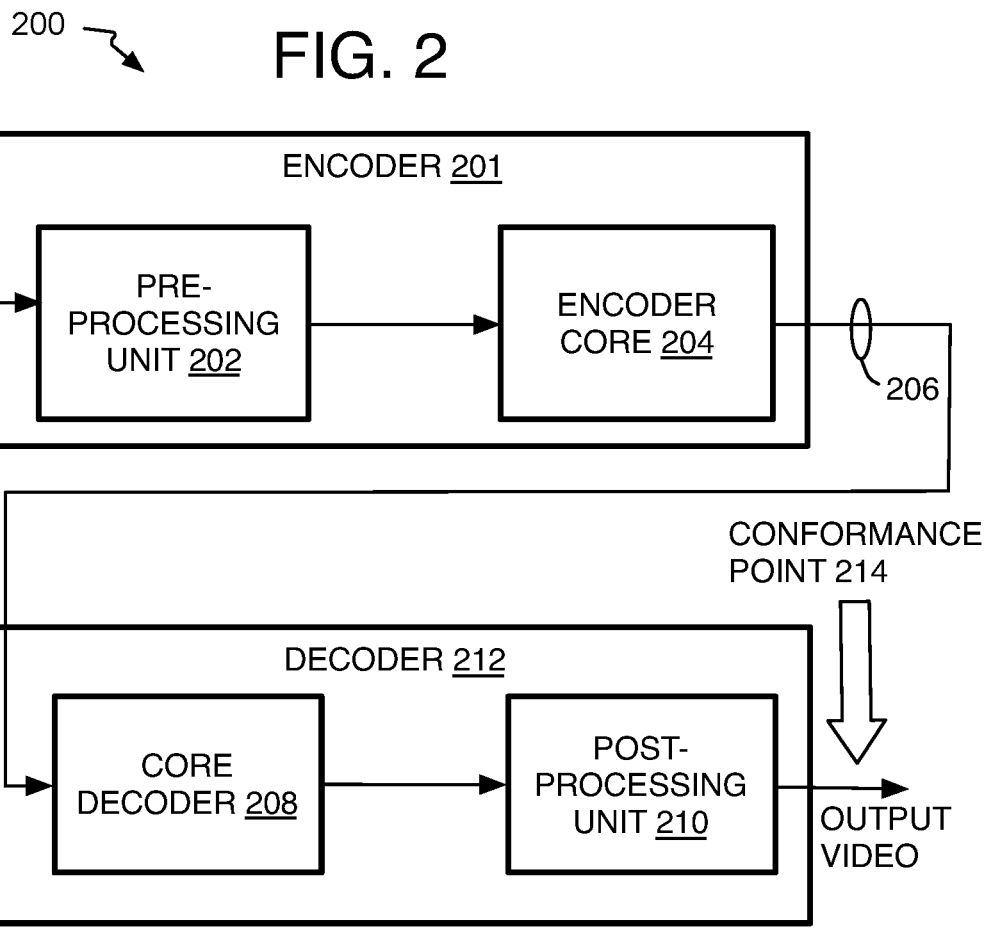
FIG. 2 is an illustrative diagram of a video coding system according to the implementations herein.

Referring to FIG. 2 for example, an image or video processing system (or video codec system) 200 may be used to perform the methods of video coding with post-processing indication described herein. The system 200 may have an image or video processing device also referred to as an encoder device or just encoder 201. The encoder 201 may have a pre-processing unit 202 to provide pre-processing capability including processes that are reversible on the decoder side, and an encoder core 204 that performs the compression of the image data. Video in the form of frames (also referred to as images or pictures) of a video sequence for example may be input to the pre-processing unit 202 to create pre-processed video. The pre-processing function may include those expected to transform the images in a manner that improves the coding efficiency when coded using a conventional encoder core 204. The pre-processing also may include other processes that do not necessarily need reversal at a decoder. A bitstream 206 then may be packed both with the encoded image data and control data including profile data that indicates the specification, format, and so forth that the images as decoded should conform to, and to transmit the packed data, either wirelessly, wired, or both, to the decoder for decoding and normative post-processing of the image data.

The bitstream 206 then may be received by a decoder or decoder device 212 that has a core decoder 208 to extract the image data and the control data, and to decode the image data. The decoded image data then may be provided to a post-processing unit 210 to perform post-processing techniques including the application of post-processes that reverse pre-processing to provide output video images in a desired format for display rather than a format used for coding. In order to make the post-processing part of the normative process, an available range of values of a profile_tier_level syntax may be expanded to require the post-processing when the profile_tier_level syntax, such as a general context interpretation code of a profile, has a certain value (such as 1 rather than 0). By one example, the code is the general context interpretation code, such as general_profile_space code for HEVC profiles. Other data may be extracted from a bitstream that indicates the type of normative post-processing. By this approach, the conformance point of the process is obtained after an image has been post-processed. Other details of this process are described below.

In some examples, video coding system 200 may include additional items that have not been shown in FIG. 2 for the sake of clarity. For example, video coding system 200 may include a processor, a radio frequency-type (RF) transceiver, splitter and/or multiplexor, a display, and/or an antenna. Further, video coding system 200 may include additional items such as a speaker, a microphone, an accelerometer, memory, a router, network interface logic, and so forth. Such implementations are shown with system 700, 800, or 900 described below.

By alternative forms, the video coding systems that perform the post-processing indication methods herein may be implemented as part of an image processor, video processor, and/or media processor and undertakes inter-prediction, intra-prediction, predictive coding, and residual prediction. In various implementations, the systems herein may undertake video compression and decompression and/or implement video codecs according to one or more standards or specifications other than HVEC, such as, for example, VP9 or other VPX-based standards, but could also be applied to H.264 (MPEG-4), and other standards where relevant or where modified to be compatible with systems that provide standard profiles. Other than the profile descriptions provided herein, the systems, schemes, or processes described herein are not necessarily all always limited to any particular video encoding standard or specification or extensions thereof.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder.

Referring to FIG. 3, an example process 300 is arranged in accordance with at least some implementations of the present disclosure. In general, process 300 may provide a computer-implemented method of video coding with post-processing indication, and emphasizes the operations on the encoder side. In the illustrated implementation, process 300 may include one or more operations, functions or actions as illustrated by one or more of operations 302 to 308 numbered evenly. By way of non-limiting example, process 300 will be described herein with reference to operations discussed with respect to example systems 200, 700, 800, or 900 of FIGS. 2 and 7-9 respectively, and where relevant.

Process 300 may include "obtain image data" 302, and as mentioned above, image data in the form of frames of a video sequence may be obtained. The image data may be pre-processed to format the image data for more efficient video coding. This may include demosaicing, de-noising and so forth. The pre-processing also may or may not include processes that convert the image data for better coding efficiency but then should be reversed after decoding for more efficient or better quality display of the image data. By one form, such pre-processing may include transforming images captured in HDR format to SDR for coding, or performing other image data conversions such as RGB color space data to YUV image data values, other chroma or luminance value conversions, color temperature conversions, and so forth.

Process 300 may include "encode the image data in conformance with a video coding profile having a profile_tier_level syntax comprising profile syntax elements indicating the conformance parameters of a video coding standard and for decoded video" 304, and by performing conventional core encoding algorithms to compress the image data using video coding standards. Thus, the image data may be encoded in conformance with a video coding standard, such as HEVC by one example, and specifically in conformance with one of the available profiles from the standard, such as Main or Main 10 profile. This better ensures that the image data is coded in such a way as to enable a decoder to determine which coding tools are required to decode the image data and to provide decoded image data with certain parameters expected by a display device for example.

Process 300 may include "wherein one of the profile syntax elements of the profile_tier_level syntax is a general context interpretation code that indicates that the image data is to be post-processed after decoding, and wherein the general context interpretation code is an existing profile syntax element originally established for reasons other than post-processing" 306. This general context interpretation code is used as a post-processing setting, and may be used with profiles such as Main 10 for HEVC by one possible example. This is performed rather than establishing a new profile for the video coding standard. In one example for HEVC, the general context interpretation code is general_profile_space, which may be located in the profile_tier_level ( ) syntax structure of the existing HEVC specification, and may be set to activate core decoding when the value for general_profile_space is set to 00, but both core decoding and post-processing when the value is set to 01 for example.

By one approach, the general context interpretation code is set by the developer when setting which profile is to be used by the encoder and by setting the general_profile_idc code in HEVC profiles. Depending on the value of the general context interpretation code, one or more post-processing techniques could be indicated that should be applied. For example, a general context interpretation code e that is selected that indicates SDR data is to be used for encoding may require HDR image data to be converted to SDR, and then should be converted back to HDR image data after decoding. Thus, this general context interpretation code will be understood to indicate that SDR to HDR post-processing conversion is one of the requirements for the profile. In this case for HEVC, the general context interpretation code (such as general_profile_space) may be set to 1 (or more precisely 01). It will be understood that other alternatives are possible as explained below.

The profile syntax element settings for the general context interpretation code other than 0 or 1 is not changed. When the code has values other than 0 or 1, the decoding of the associated coding video sequence (CVS) may be skipped by the decoder. Values other than 0 or 1 are reserved to activate future alternative coding specification standards that may have their own sets of profiles. The decoding will be skipped even though the profile identification code ( ) has a valid value for the decoder that receives the profile and image data.

Process 300 may include "provide the image data and profile_tier_level syntax settings in a bitstream to be transmitted to a decoder to have the image data decoded, post-processed after the decoding depending on a setting of the general context interpretation code, and available to display images" 308. Thus, the image data is packed into packets and placed in the bitstream, and profile settings, as part of the non-video coding layer (non-VCL) of a network abstraction layer (NAL) unit such as in the parameter sets for example, are also packed and placed in the bitstream. Once extracted and read at the decoder, the decoder will know whether or not to perform the post-processing depending on the value of the general context interpretation code as mentioned above, and explained in greater detail below. The decoder also will know the type of post-processing that is indicated by the general context interpretation code as explained below. Once post-processed, the image data then may be made available for display.

Referring to FIG. 4, an example process 400 is arranged in accordance with at least some implementations of the present disclosure. In general, process 400 may provide a computer-implemented method of video coding with post-processing indication, and emphasizing the operations on the decoder side. In the illustrated implementation, process 400 may include one or more operations, functions or actions as illustrated by one or more of operations 402 to 408 numbered evenly. By way of non-limiting example, process 400 will be described herein with reference to operations discussed with regard to example systems 200 and 700-900 of FIGS. 2 and 7-9 respectively, and where relevant.

The process 400 may comprise "obtain encoded image data and profile_tier_level syntax settings of a video coding profile and having profile syntax elements indicating the conformance parameters of a video coding standard and for decoded video" 402. Thus, the coded image data and profile data may be extracted from a received bitstream. The profile may be an HEVC profile such as Main 10 to name one possible example. The profile may include a profile syntax element related to post-processing as follows.

The process 400 also may include "wherein one profile syntax element of the profile_tier_level syntax indicates that the image data is to be post-processed after decoding, and wherein the one profile syntax element is an existing profile syntax element originally established for reasons other than post-processing" 404. Thus, as explained for process 300, the image data may or may not have been pre-processed to a format that is efficient for coding. Either way, the image data may be transformed after decoding to another format, or previous format, that is desirable for display of the images, such as receiving video in SDR format that needs to be transformed into HDR format after decoding by one of the examples mentioned above. As mentioned, the general context interpretation code is used to indicate that post-processing is required, and may be a general_profile_space code in HEVC, and extracted from the non-VCL NAL units of the sequence or slice headers. The values of the general context interpretation code may be 0 for decoding without post-processing, 1 for decoding with post-processing, and anything else indicates that processing of the current CVS should be omitted or at least is not required. It will be understood that different values than 0 and 1 could be used.

The process 400 also may include "decode the encoded image data" 406, and by decoding processes that use an HEVC standard in this example case although other standards may be used. The relevant details are provided below. The result is a set of decoded decompressed images that may or may not have been pre-processed, and are ready for post-processing when provided.

The process 400 also may include "depending on the setting of the one profile syntax element, provide the decoded image data to be post-processed to use the post-processed image data to display images" 408. Thus, when the context interpretation code indicates that post-processing should take place, once the coded image data is decoded, thereafter the coded image data may be provided to a post-processing unit. The code may indicate that a certain type of post-processing is to be performed, such as SDR back to HDR data, or YUV data back to RGB data, and so forth. It will be understood the post-processing unit may or may not be considered part of the decoder.

The post-processed image data then may be provided for display, or stored and/or further transmitted for ultimate display.

Referring now to FIG. 5A, a detailed example post-processing indication process 500 is arranged in accordance with at least some implementations of the present disclosure. In general, process 500 may provide a computer-implemented method of video coding with post-processing indication, and from the perspective of the encoder side. In the illustrated implementation, process 500 may include one or more operations, functions or actions as illustrated by one or more of operations 502 to 520 numbered evenly. By way of non-limiting example, process 500 will be described herein with reference to operations discussed with respect to example systems 200 and 700-900 of FIGS. 2 and 7-9 respectively, and where relevant.

Process 500 may include "determine profile to be used by the encoder" 502. As mentioned above, each video coding standard has a list of available profiles where each profile indicates the use of certain capabilities such as bit depth, chroma sampling format, picture size, and many others. The use of profiles provides significant adaptability so that an encoder and decoder can code videos with different formats to increase efficiency and quality of the images. Once a profile is selected, the selection is normally fixed, and the encoding and decoding are performed in conformance with that profile.

By the present example, one HEVC specification provides profiles referred to as main, main 10, main still picture profile, format range extensions profiles including monochrome, monochrome 12, and monochrome 16 profiles, main 12 profile, main 4:2:2 10, and main 4:2:2 12 profiles, main 4:4:4, main 4:4:4 10, and main 4:4:4 12, main intra, main 10 intra, main 12 intra, main 4:2:2 10 intra, main 4:2:2 12 intra, main 4:4:4 intra, main 4:4:4 10 intra, main 4:4:4 12 intra, main 4:4:4 16 intra, main 4:4:4 still picture, main 4:4:4 16 still picture, and format range extensions high throughput profiles that may include high throughput 4:4:4 16 intra profile to name a few examples. Main 10 will be referenced for the continuing example provided herein. It will be understood that standards other than HEVC may be used and different profiles may be used in that case, or HEVC may have other profiles not mentioned here.

The developer selects the profile that best matches the desired capabilities that can be provided on the encoder and decoder, and the desired parameters of the decoded image data at the conformance point, which in this case will be after post-processing. Based on this decision, the developer may "obtain bitstream profile structure to be placed in a bitstream with video sequences" 504 to be transmitted to the decoder. More precisely, the developer creates a profile structure or template with a field for each profile_tier_level syntax setting that is to have a value for individual profiles. The fields then can be populated for specific profile values as mentioned below. The profile code syntax can be generated by the encoder as part of the bitstream encoding process, or it may be prepared and stored where it is accessible to the encoder device so that the encoder multiplexer or other bitstream construction units can obtain the profile code values and place them in appropriate locations in NAL NON-VCL areas of video, picture, slice (or other segment) headers. It will be understood that the syntax may be generated on the fly by the encoder, rather than having been prepared in advance.

Before discussing populating the profile code fields that are relevant to post-processing, the basic structure of the profile should be understood. Coded video content conforming to a profile of the HEVC recommendation and international standard for example each uses a common syntax. In order to achieve a subset of the complete syntax, flags, parameters and other syntax elements may be included in the bitstream that signal the presence or absence of syntactic elements that occur later in the bitstream.

Moreover, in many applications, it is currently neither practical nor economical to implement a decoder capable of dealing with all hypothetical uses of the syntax within a particular profile. In order to deal with this problem, "tiers" and "levels" are specified within each profile. The tier, and the level within the tier, indicate differences in capabilities that are a matter or degree for the same feature such as picture resolution, frame rate, and so forth. By one approach, a level of a tier is a specified set of constraints imposed on values of the syntax elements in the bitstream. These constraints may be simple limits on values. Alternatively, they may take the form of constraints on arithmetic combinations of values (e.g., picture width multiplied by picture height multiplied by number of pictures decoded per second). A level specified for a lower tier is more constrained than a level specified for a higher tier. Thus, by one example, only levels 1 to 4 can be used in the lower tier while levels 5 to 31 may be limited to the upper tier. The profiles, tiers, and levels also specify restrictions on the bitstreams and hence limits on the capabilities needed to decode the bitstreams. Profiles, tiers and levels also may be used to indicate interoperability points between individual decoder implementations.

By the HEVC example using the Main 10 profile, and relevant to post-processing as explained above, the HEVC encoder may create an HEVC bitstream to have a non-zero value of the general context interpretation code, which in this case is the profile code general_profile_space syntax element in the profile_tier_level( ) syntax structure. For this example, a value of 1 (or other value) is used for the non-zero value of general_profile_space to indicate that the mandatory or normative post-processing that forms the conformance point of the image data after the post-processing is to be performed in addition to the decoding. The HEVC encoder also creates the HEVC bitstream to have a value at profile code general_profile_idc that indicates which profile is to be used at the decoder (and is being used at the encoder). This value may be 2 for the Main 10 HEVC profile. The general_profile_idc may have many different values indicating a variety of decoding profiles.

More specifically, the profile_tier_level( ) syntax structure of HEVC may include both the syntax elements general_profile_idc and general_profile_space. Below is an example profile_tier_level( ) syntax structure of the existing HEVC specification, and the semantics of general_profile_ space and general_profile_idc in the specification below the table, and as shown under the descriptor column, 'u' refers to unsigned and the parenthetical (#) number refers to the number of bits for the field or code value.

| | Descriptor |
|---|---|
| profile_tier_level( profilePresentFlag, maxNumSubLayersMinus1 ) { | |
|   if( profilePresentFlag ) { | |
|     general_profile_space | u(2) |
|     general_tier_flag | u(1) |
|     general_profile_idc | u(5) |
|     for( j = 0; j < 32; j++ ) | |
|       general_profile_compatibility_flag[ j ] | u(1) |
|     general_progressive_source_flag | u(1) |
|     general_interlaced_source_flag | u(1) |
|     general_non_packed_constraint_flag | u(1) |
|     general_frame_only_constraint_flag | u(1) |
|     if( general_profile_idc = = 4 \|\| | |
|     general_profile_compatibility_flag[ 4 ] \|\| | |
|       general_profile_idc = = 5 \|\| | |
|       general_profile_compatibility_flag[ 5 ] \|\| | |
|       general_profile_idc = = 6 \|\| | |
|       general_profile_compatibility_flag[ 6 ] \|\| | |
|       general_profile_idc = = 7 \|\| | |
|       general_profile_compatibility_flag[ 7 ] ) { | |
|     /* The number of bits in this syntax structure is not affected by this condition */ | |
|       general_max_12bit_constraint_flag | u(1) |
|       general_max_10bit_constraint_flag | u(1) |
|       general_max_8bit_constraint_flag | u(1) |
|       general_max_422chroma_constraint_flag | u(1) |
|       general_max_420chroma_constraint_flag | u(1) |
|       general_max_monochrome_constraint_flag | u(1) |
|       general_intra_constraint_flag | u(1) |
|       general_one_picture_only_constraint_flag | u(1) |
|       general_lower_bit_rate_constraint_flag | u(1) |
|       general_reserved_zero_34bits | u(34) |
|     } else | |
|       general_reserved_zero_43bits | u(43) |
|     if( ( general_profile_idc >= 1 && general_profile_idc <= 5 ) \|\| | |
|       general_profile_compatibility_flag[ 1 ] \|\| | |
| general_profile_compatibility_flag[ 2 ] \|\| | |
|       general_profile_compatibility_flag[ 3 ] \|\| | |
| general_profile_compatibility_flag[ 4 ] \|\| | |
|       general_profile_compatibility_flag[ 5 ] ) | |
|     /* The number of bits in this syntax structure is not affected by this condition */ | |
|       general_inbld_flag | u(1) |
|   Else | |
|     general_reserved_zero_bit | u(1) |
|   } | |
|   general_level_idc | u(8) |
|   for( i = 0; i < maxNumSubLayersMinus1 ; i++ ) { | |

The following is a description of some of the elements or profile codes that are relevant to the post-processing indication methods used herein. A number of the elements below reference an Annex A, which is the profile, tier and level semantics for the HEVC standard and that may be found in Annex A of the ISO/IEC 23008-2:2013/PDAM5 Screen Content Coding (SCC) Extensions for High Efficiency Video Coding (HEVC), corresponding to JCTVC-T1005 of the Joint Collaborative Team on video Coding (JCT-VC) of ITU-T WP3/16 and ISO/IEC JTC 1/SC 29/WG 11.

The standards specification may be modified as follows (shown in underline) where the language in quotes indicate the language as recited in the existing video coding standard specification for the profile:

"general_profile_space specifies the context for the interpretation of general_profile_idc and general_profile_compatibility_flag[j] for all values of j in the range of 0 to 31, inclusive. The value of general_profile_space shall be equal to 0 or 1 in bitstreams conforming to this version of this Specification. Other values for general_profile_space are reserved for future use by ITU-T|ISO/IEC. Decoders shall ignore the coded video sequence (CVS) when general_profile_space is not equal to 0 or 1", where the underlined text has been added.

"A general_tier_flag specifies the tier context for the interpretation of general_level_idc as specified in Annex A, and indicates which one of the available tiers is to be provided for a video sequence being encoded."

"The general_profile_idc, when general_profile_space is equal to 0 or 1, indicates a profile to which the CVS conforms as specified in Annex A cited above. For example, Bitstreams shall not contain values of general_profile_idc other than those specified in Annex A. Other values of general_profile_idc are reserved for future use by ITU-T|ISO/IEC." Additions shown in underline. Again, the specification here is modified to permit decoding and normative post-processing when the general context interpretation value is 1.

The general_profile_compatibility_flag[j] code mentioned above indicates whether a current coded video sequence (CVS) conforms to the profile indicated by the profile identification code (general_profile_idc).

Process 500 may include "populate profile fields for image data being encoded" 506. This may include "populate profile identification code, and tier and/or level identification codes" 508. Thus, this operation may include setting the other codes mentioned on the profile_tier_level syntax table above including the profile selection code (general_profile_idc), the general_tier_flag to set which tier is to be used, and the general_level_idc code for example.

This operation also may include if post-processing is to be applied, "set general context interpretation code to indicate post-processing is needed" 510. As mentioned, the developer may populate the profile code fields including setting the general context interpretation code (general_profile_space) to 1 (or other value) when normative post-processing is to be performed.

Process 500 may include "determine other post-processing information data to be placed in the bitstream" 512. Here, the developer may set values that indicate the type of normative post-processing to be applied after decoding of the image data. This data may be placed in other areas of the NAL non-VCL header sections that are not considered to be part of the profile. This may be provided in the SEI metadata or as part of one of the parameter sets (PPS, SPS, and/or VPS), including the VUI, for example depending on which data is to be post-processed and when adaptable post-processing may be provided. Thus, post-processing may apply to individual selected pictures, certain sequences in a video of a number of sequences, or videos with certain types of video sequences. The post-processing here may include the type of post-processing referred to by the general context interpretation code, which may be the only post-processing with information in the bitstream or may be one type of a number of types of post-processing indicated in the bitstream. By one form, the post-processing type indicated by the general context interpretation code is normative or mandatory to establish a profile conformation point after post-processing of the mandatory type while the post-processing data of other types of post-processing in the bitstream may or may not be optional on the decoder side. When multiple types of post-processing are to be considered normative, the general context interpretation code may have a different value to indicate a different normative type of post-processing, or different combination of post-processing types. Thus, for example, 0 may refer to no post-processing with decoding, 1 may refer to decoding with HDR conversion, 2 may refer to decoding with RGB conversion, and 3 may refer to decoding with both of these types of post-processing. Any numbers not assigned are still to be considered to permit the decoder to omit the decoding altogether. Many different arrangements for many different types of post-processing such as these are possible.

Process 500 may include "obtain image data of video sequence to be encoded" 514. As mentioned, image data in the form of raw image data may be obtained from an image capture device for example, the raw image data may be divided into frames.

Then, process 500 may include "pre-process image data" 516. The image data may or may not be pre-processed, and may include a variety of different types of pre-processing. This may include noise reduction, pixel linearization, and shading compensation, resolution reduction, Bayer demosaicing, and/or vignette elimination, temporal de-noising, image sharpening, and so forth. By one form, the image data is pre-processed at least to one or more formats that are more efficient for coding and where it is desirable, or necessary, to reverse the pre-processing with post-processing after decoding so that the decoded images can be displayed. Thus, the pre-processing may include transforming images captured in HDR format (such as 10-bit YUV 4:2:0 data) to SDR (such as 10-bit YUV 4:2:0 with an SDR dynamic range representation), converting RGB color space values to YUV color space values for coding, converting the image data from one chroma subsampling standard to another (such as 4:2:2 to 4:4:4) for coding, performing color temperature conversions, or other chroma and/or luminance conversions. Other examples are known as well.

Process 500 may include "encode image data according to profile" 518. The encoder encodes the image data of a video for example to conform the image data to a profile of HEVC, such as Main 10, to create an HEVC bitstream, and that is modified to include the post-processing indicator at the general context interpretation code as explained above. The Main 10 profile is just one example profile of many HEVC or other profiles for other standards that can be used, some of which were listed above as well. Such encoding may include both lossy (quantization) and loss-less coding such as entropy coding. The result of the encoding is coded or compressed image data ready to be placed in a bit stream for transmission to a decoder.

Process 500 may include "place image data in bitstream" 520, and by use of a multiplexer by one example.

Process 500 may include "place profile data in bitstream" 522, where the multiplexer may retrieve both image data (VCL data for example) and corresponding (or associated) profile data (non-VCL header data for example) to be placed in order in the bitstream as the bitstream is being transmitted by one example.

Process 500 may include "place other post-processing data in bitstream" 523. As mentioned other data is provided to indicate the type of post-processing that must or can be provided by the decoder to obtain conformance, and may indicate which type (or types) of post-processing is to be considered normative. It is conventionally allowable, but not required, that the bitstream contain information describing parameters used in other adaptive pre- and/or post-processing functions and which may or may not be present in parameter sets, such as the picture parameter set (PPS), sequence parameter set (SPS), or video parameter set (VPS). When the decoder provides more than one type of post-processing, the type, or types, of post-processing that is to be considered normative as indicated by the general context interpretation code may be indicated by the value of the general context interpretation code. In this case, as mentioned above, each type of post-processing, or different combinations of post-processing types, may have a different value for the code. For example, 1 may refer to HDR conversion, 2 may refer to RGB conversion, and 3 may refer to both being included in normative post-processing by one possible example.

Process 500 may include "transmit bitstream" 524, and therefore, the bitstream or stacks of frame data and header data, are provided to a transmission unit for example for wired or wireless transmission to a decoder. The units capable of providing such transmission are mentioned below.

Process 500 may include "more video sequences?" 526. If not, the process on the encoder side has ended. If so, the process loops to operation 514 to obtain more video sequences to be encoded and placed in the bitstream with corresponding profile data.

Figure 5B:
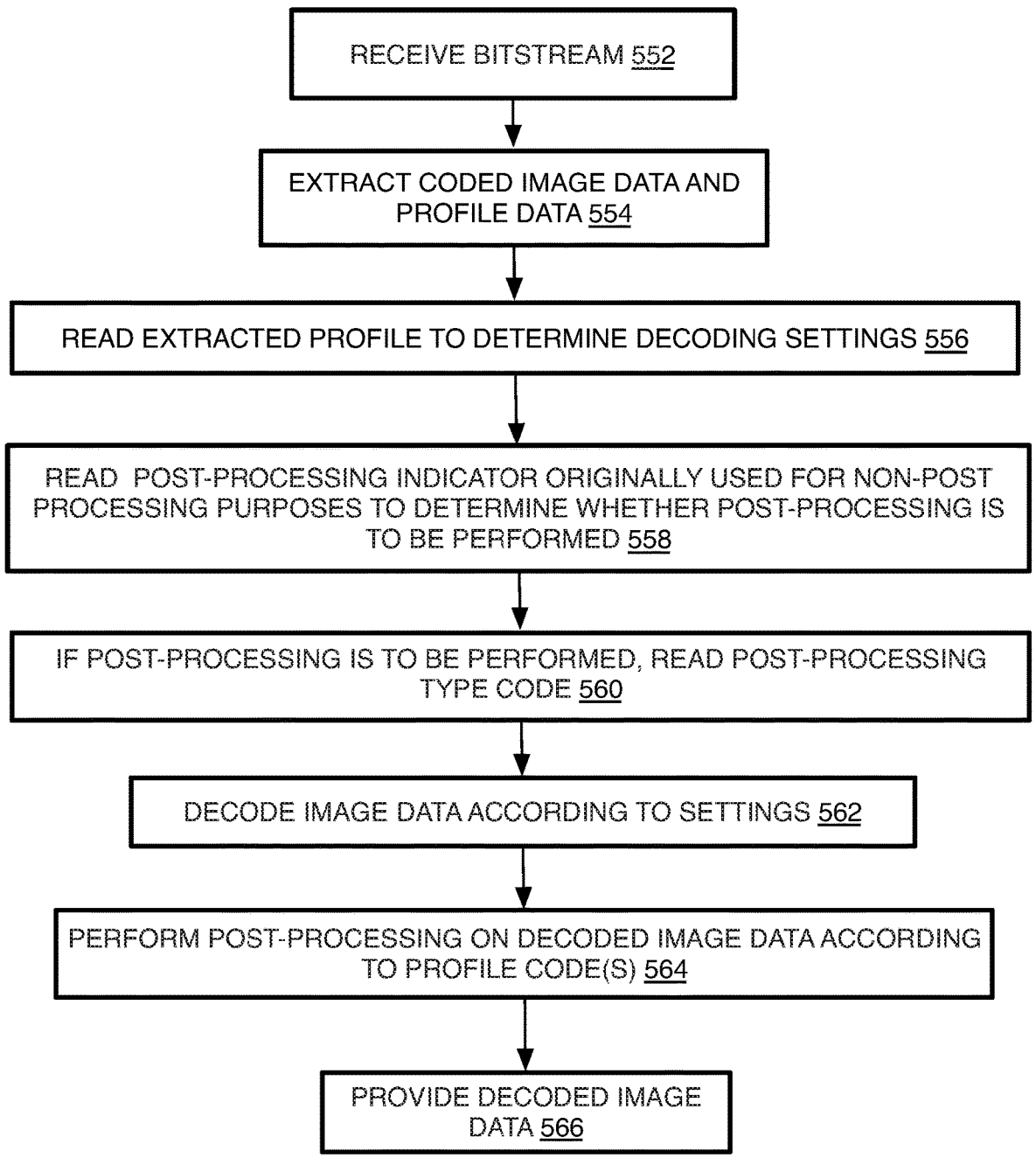
FIG. 5B is another detailed flow chart of a method of video coding with post-processing indication according to the implementations herein.

Referring to FIG. 5B, a process 550 may provide another computer-implemented method of video coding with post-processing indication, and from the perspective of the decoder side and arranged in accordance with at least some implementations of the present disclosure. In the illustrated implementation, process 550 may include one or more operations, functions or actions as illustrated by one or more of operations 552 to 566 numbered evenly. By way of non-limiting example, process 550 may be described herein with reference to operations discussed with respect to FIGS. 2 and 7, and may be discussed with reference to example systems 200 and 700 discussed below, and where relevant.

Process 550 may include "receive bitstream" 552. Thus, a decoder may have a receiver unit to wired or wirelessly receive the bitstream. Then, process 550 may include "extract coded image data and profile_tier_level syntax data" 554, such that a de-multiplexer for example may extract the image data in the form of frames for example, and the non-VCL data including profile syntax element codes and general context interpretation codes mentioned herein, and other overhead data such as SEI metadata and parameter sets.

Process 550 may include "read extracted profile to determine decoding settings" 556. Thus, the decoder reads the profile_tier_level syntax settings of the profile to determine which profile is to be conformed with when the decoder provides decoding for multiple profiles or that a compatible profile is indicated when the decoder only provides for one profile or a limited number of profiles. Thus, the profile, tier, and level codes are read, as well as other codes in the profile to activate the correct algorithms and coding tools to obtain a conforming decoded video sequence.

Whether considered part of operation 556 or a separate operation, process 550 may include "read post-processing indicator originally used for non-post processing purposes to determine whether post-processing is to be performed" 558, and where the post-processing indicator is the general context interpretation code of the profile_tier_level syntax by one example. Thus, the values to be accepted by a decoder for the general context interpretation code has been modified. This code was traditionally set to 0 to indicate decoding and any other value indicating the decoder is not required to decode the video sequence as explained above, Now, however, a decoder conforming to a profile with a particular profile value of general_profile_idc (also found in the profile_tier_level syntax by one example) with normative post-processing capability is required to perform the normal core decoding process plus the specified normative post-processing process of any bitstream which contains general_profile_idc equal to that profile value and general_profile_space equal to the specified non-zero profile space value such as 1. The bitstream is input, for this example, to an HEVC Main 10 profile decoder which has been modified to allow a single non-zero value of general_profile_space, but is otherwise equivalent to a legacy Main 10 profile decoder.

Thus, the decoder with post-processing capability would be modified to understand that the image data is to be decoded and to apply the specified post-processor function to provide output video which is used as a conformance point after the post-processing. This additional post-processing capability can be easily added to legacy decoders conforming to existing profiles, and conceptually, the conformance point of a decoder with post-processing capability is changed to be the output of the normative post-processing function. The decoder is modified in two key ways. First, the process of determining if the received bitstream is decodable is changed so the decoder can determine that it can decode a bitstream with a non-zero value of general_profile_space. This is simply performed by changing the acceptable values for general_profile_space in a profile syntax_tier_level section of the decoder's coding for that profile. Second, the normative post-processing is applied after decoding and before output of the decoded video such that no change is needed regarding the control of the decoding processing itself.

For decoders that do not have the normative post-processing capability, it will be understood that such a decoder would not need to be modified. For example, even though the HEVC bitstream has a valid general_profile_idc value of 2, a legacy HEVC Main 10 profile decoder without post-processing capabilities, such as a legacy decoder, will decode the coded image data when the general context interpretation code is 0, but will not be required to decode the coded image data when the general context interpretation code (general_profile_space) value is not equal to 0 according to the conventional specification of HEVC. In this case, this is true for any legacy decoders, still conforming to the existing profiles such as Main 10 by one example that do not have the normative post-processing capability.

Process 550 may include "if post-processing is to be performed, read post-processing type code" 560. Thus, by one form, when the setting of the general context interpretation code of the profile_tier_level syntax indicates normative post-processing is to be performed, the type of post-processing may be read from other non-profile data when the decoder provides a number of post-processing algorithms that are not all mandatory. Other data may or may not be provided in the bitstream (or separate bitstream) that describes parameters used in other adaptive pre- and/or post-processing functions that applies depending on the arrangement of the image data and may be applied on certain pictures or even certain slices within a picture. These indicators and parameters may or may not be present in parameter sets, such as the picture parameter set (PPS), sequence parameter set (SPS), or video parameter set (VPS) in the Non-VCL section of the NAL units, or in Supplemental Enhancement Information (SEI) messages. This data may be used to determine which type of post-processing is to be performed as indicated by the general context interpretation code and as described above.

Also as mentioned above, multiple values may be provided for the general context interpretation code so that individual values indicate different post-processing types or combinations of post-processing types. The examples are also provided above.

By other options mentioned above, no such reading is necessary because only one type of post-processing at the decoder side could be the normative post-processing because it is the only type provided, or all types provided by the decoder are considered normative, or considering the state or parameters (or format) of the decoded image data, it is clear which post-processing must be the normative post-processing due to the required parameters of the image data from the decoder side (that must be obtained by post-processing).

Otherwise, even though a decoder may be modified to understand that a value of 1 (and/or other values) of the general context interpretation code includes normative post-processing, if the modified decoder does not have the type of post-processing indicated by the general context interpretation code, then the decoder may omit the decoding altogether because the decoder would not be able to produce decoded and post-processed image data that conforms to the profile.

As to the specific types of post-processing, the specified normative post-processor functionality is likely to be inversely related to the pre-processor functionality. Post-processed video is expected to be of significantly better subjective video quality than video that has not been post-processed. The post-processing function could be fully defined in a revised HEVC standard, such that all conforming decoders including post-processor capability would be required to create bit-exact video output from the same bitstream as the reference decoder defined in the standard. By one example, and as mentioned above, the pre-processing and post-processing functions may be non-linear transfer functions aimed at reshaping High Dynamic Range (HDR) video content, with the post-processing function being an inverse of the pre-processing function, described in certain video coding standards and/or extensions. The pre-processing function may be defined such that a legacy decoder without post-processing capability would output a Standard Dynamic Range (SDR) video displayable on an SDR display, such as those described in certain video coding standards and/or extensions. Other types of post processing that corresponds to pre-processing may include other image data conversions such as YUV image data to RGB color space data values, other chroma or luminance value conversions, color temperature conversions, and so forth.

Process 550 may include "decode coded image data according to settings" 562, and as already described above, image data extracted from the bitstream is now used to reconstruct the images or frames, and in conformance with the profile code data. The result is decoded or uncompressed images or frames.

Process 550 may include "perform post-processing on decoded image data according to post-processing indication and type codes" 564. Thus, at least the normative post-processing is applied to the decoded images to obtain image data that conforms to the profile when the profile includes the normative post-processing. The normative post-processing may include a single type of post-processing or a number of different post-processing operations. In addition, post-processing not considered normative still optionally may be performed by a decoder when indicated in other non-profile data such as the metadata or parameter sets for example, or may be performed by the decoder regardless of the profile such as scaling.

Process 550 may include "provide decoded image data" 566, where the images are now ready to be provided to a display, stored, or further transmitted to another device.

The method disclosed herein not only applies to encoders, decoders, and bitstreams, but also applies to middle boxes, video servers, and players which utilize profile indications, for example in capabilities exchange and negotiation, and in the Session Description Protocol (SDP). These may apply to HEVC standards or other standards as mentioned above.

Figure 6:
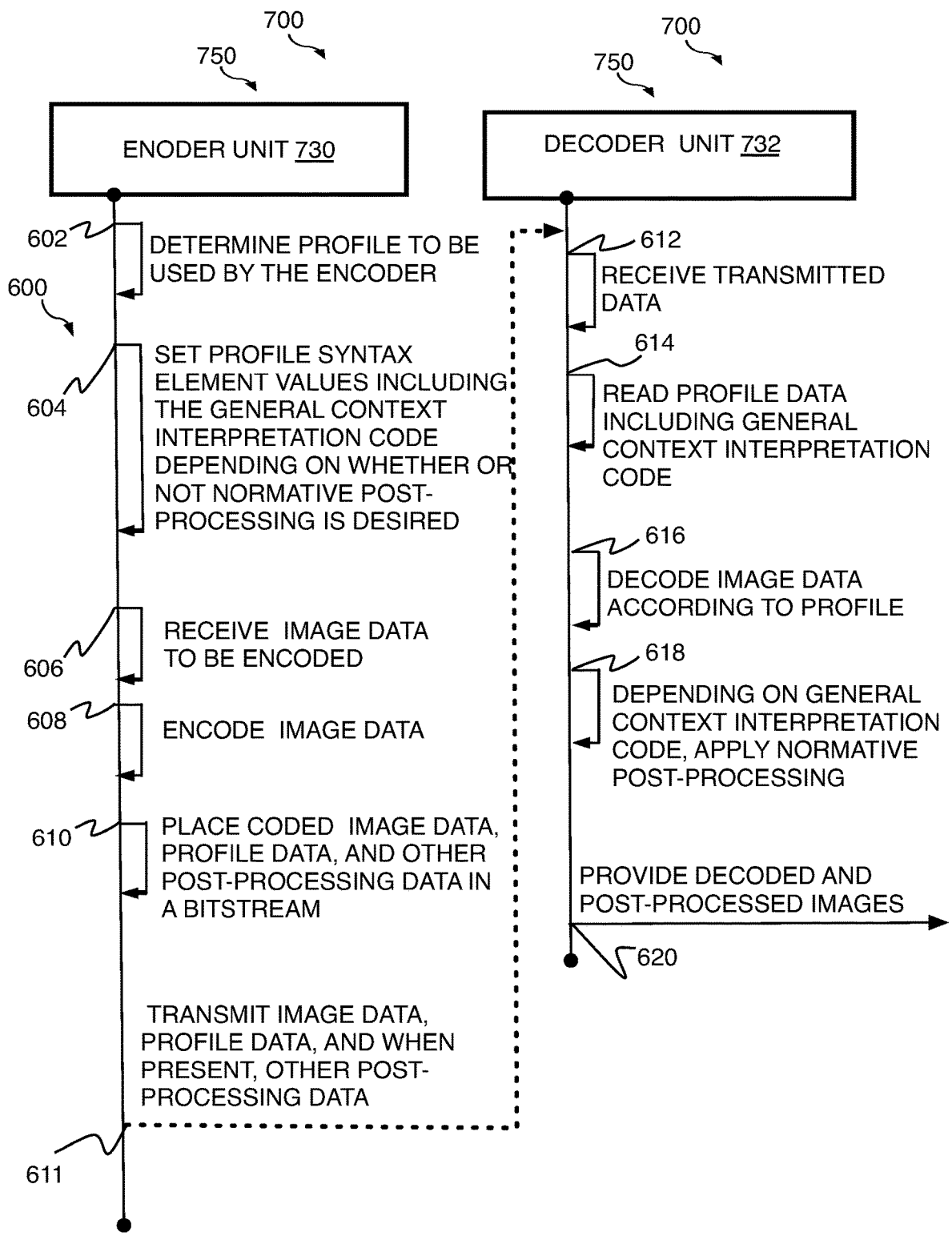
FIG. 6 is an illustrative diagram of an example system in operation for providing a method of video coding with post-processing indication according to the implementations herein.

Referring now to FIG. 6, two systems 700 may be used for an example post-processing indication process 600 and shown in operation, and arranged in accordance with at least some implementations of the present disclosure. In the illustrated implementation, process 600 may include one or more operations, functions, or actions as illustrated by one or more of actions 602 to 620 numbered evenly, and used alternatively or in any combination. By way of non-limiting example, process 600 will be described herein with reference to operations discussed with respect to any of the implementations described herein wherein relevant.

In the illustrated implementation, each system 700 may include a processing unit(s) 720 with logic units or logic circuitry or modules 750, the like, and/or combinations thereof. For one example, logic circuitry or modules 750 may include a video encoder 730 with a pre-processing unit 702 similar to pre-processing unit 202 (FIG. 2), core encoder unit 704 and a profile handling unit 752, and/or a video decoder 732 with a core decoder unit 708, a profile handling unit 754, and a post-processing unit 710 similar to post-processing unit 210 (FIG. 2). For the purposes of process 600, two systems 700 are provided where one of the systems 700 acts as the encoder and the other system 700 acts as the decoder. Although process 600, as shown in FIG. 6, may include one particular set of operations or actions associated with particular modules or units, these operations or actions may be associated with different modules than the particular module or unit illustrated here.

Process 600 may include "determine profile to be used by the encoder" 602, and here this refers to determining what capabilities the encoder has, or will have, and the desired parameters of the decoded image data at the point of conformance, and then selecting a profile that meets or is closest to those parameters. This is described above.

Process 600 may include "set profile syntax element values including the general context interpretation code depending on whether or not normative post-processing is desired" 604. As mentioned above, for HEVC, the code is the general_profile_space code and may be set to 0 so that decoders will decode the image data but post-processing is not required, set to 1 to indicate that normative post-processing is required after the decoding of the image data. The other values reserved for future standard versions may show up either when a new standard is provided but the decoder is not compatible with the new standard or when an error occurs for example, and in these cases, the decoding of the image data at all is optional for the decoder. Alternatively, more numbers may be used to indicate multiple normative post-processing types or combinations of post-processing types that are to be normative as explained above.

Process 600 may include "receive image data to be encoded" 606. Once the encoder has its parameters set, the encoder may receive image data for encoding, and as already described in detail above, the data may be pre-preprocessed, and some of the pre-processing may include types that are to be reversed by normative post-processing.

Process 600 may include "encode image data" 608, and to compress the image data in accordance with the selected profile so that subsequently decoding the image data can provide decoded image data with parameters that conform to those provided by the profile.

Process 600 may include "place coded image data, profile data, and other post-processing data in a bitstream" 610. Thus, the profile code settings, which maybe the profile_tier_level syntax settings, are placed within packets having NAL non-VCL header areas of the image data designated for that purpose while the compressed image data is placed in the NAL VCL areas of the packets being placed in the bitstream. Some of the details are provided above.

Process 600 may include "transmit image data, profile data, and other post-processing data in a bitstream" 611. The image data is then transmitted from a transmitting device either wirelessly or through wired connections or both. As also explained above, the type of post-processing that is to be performed as a normative part of the profile may be indicated by the general context interpretation code value, or alternatively in other areas of the data that are not considered part of the profile such as with SEI metadata or in the parameter sets. This latter data also may be transmitted in the same or separate bitstream with the image and profile data.

Process 600 may include "receive transmitted data" 612, and now on a decoder side, the decoder may receive the bitstream, and extract the packets, and extract the image and profile data from the packets, and receive and extract the post-processing type indicators from other parts of the data as explained herein.

Process 600 may include "read profile data including general context interpretation code" 614. Also as mentioned above, the profile data, and specifically the profile_tier_level syntax, is read to determine which profile to use, as well as which tier and level of the profile to use, and in turn which coding tools to use and at what settings. This may include determining whether decoding should be performed on a video sequence at all, such as when the general context interpretation value is not 0 or 1 (or other value than 1) by one example, or when the value is 1 (or other value) but the decoder has not been modified to accept the non-zero value to indicate normative post-processing is to be performed as with a non-modified legacy decoder. When the present decoder is a modified decoder as described above, the decoder either understands what type of normative post processing is to be performed because (1) the value of the general context interpretation code indicates which type of post-processing is normative, (2) the decoder only provides one such type of post-processing, (3) it is easy to determine which of a limited number of types of post-processing is the normative post-processing depending on the parameters of the image data decoded, or (4) all of multiple post-processing types provided at a decoder are considered to be part of the normative post-processing.

Otherwise, the encoder may determine the type of normative post-processing from other non-profile data transmitted with the image and profile data such as in the SEI metadata or in the parameter sets, such as the VPS, SPS, or PPS as mentioned above.

Process 600 may include "decode image data according to profile" 616. Thus, once the decoder reads the profile_tier- _level syntax including which profile, tier, and level is to be applied, the decoder uses the appropriate algorithms and coding tools to decode the image data to have parameters that conform to the profile at least as far as de-compressing the image data.

Process 600 may include "depending on general context interpretation code, apply normative post-processing" 618. Thus, when the decoder has the capability, and the general context interpretation code (general_profile_space for HEVC) indicates normative post-processing is to be applied, and the type of normative post-processing is identified as mentioned above, then the decoder performs normative post-processing, or provides the image data to a separate unit that performs the normative post-processing. Also as mentioned herein, other post-processing may be performed that may or may not be considered part of the normative post-processing. The result is decoded and post-processed image data that conforms to the selected profile.

Process 600 then may include "provide decoded and post-processed images" 620, and to be provided to a display, stored, or for further transmission to other devices.

While implementation of example process 300, 400, 500, and/or 600 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit also may utilize a portion of software to implement its functionality.

Figure 7:
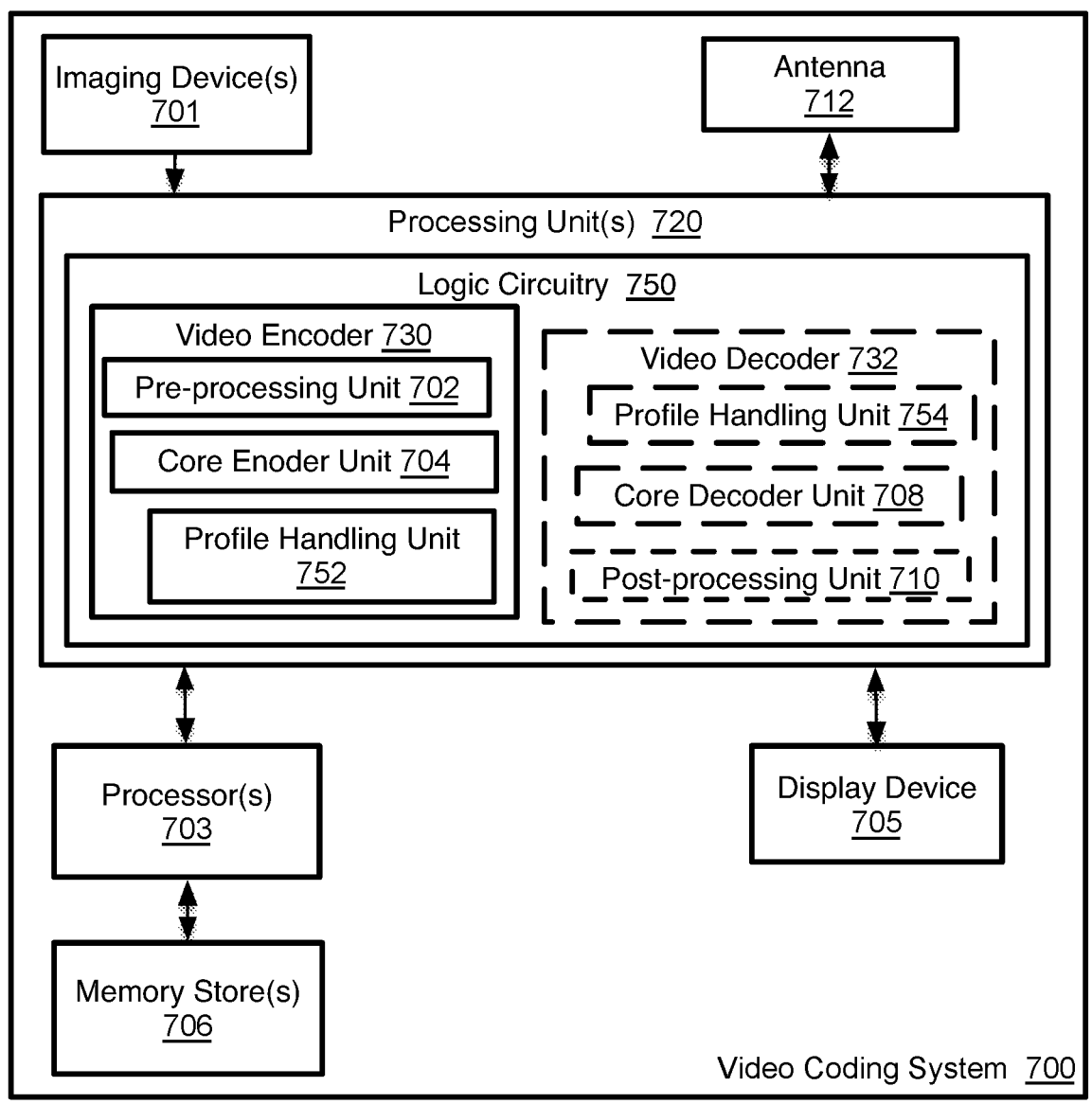
FIG. 7 is an illustrative diagram of an example system.

Referring to FIG. 7, an example video coding system 700 for providing video coding with post-processing indication may be arranged in accordance with at least some implementations of the present disclosure. In the illustrated implementation, the system 700 may include an imaging device 701 or may be connected to a separate imaging device 701. By one form, the imaging device may be a video camera, still picture camera, or both, and the device 700 holds such a camera such as a smartphone, tablet, and so forth. By other examples, the device 700 is a camera, and the imaging device 701 is the hardware and sensors that form the image capturing components of the camera.

System 700 also may include one or more central and/or graphics processing units or processors 703, a display device 705, and one or more memory stores 706. Central processing units 703, memory store 706, and/or display device 705 may be capable of communication with one another, via, for example, a bus, wires, or other access. In various implementations, display device 705 may be integrated in system 700 or implemented separately from system 700.

The system 700 also may have an antenna 712 to receive or transmit image data, profile data, and other post-processing related data. Thus, in some cases, the imaging device 701 may not be the only source of the image data.

As shown in FIG. 7, and discussed above, the processing unit 720 may have logic circuitry 750 with a video encoder 730 that has a pre-processing unit 702 and core encoder 704, or a decoder 732 with a core decoder 708 and post-processing unit 710, or both an encoder 730 and decoder 732 to be operated in the alternative. Thus, system 700 as shown may be either on the encoder side or decoder side for the system (or may alternatively act as either). These components may be respectively similar to the similarly named components on FIG. 2 except that two devices 700 would be needed, one to act as the encoder and the other to act as the decoder. The video encoder 730 may have a profile handling unit(s) 752 to manage profile control data, profile conformity, and other non-VCL data including those features that are relevant to the post-processing, and to have profile parameters, in the form of profile_tier_level syntax for example, placed into the bitstream along with the image data that is relevant to the post-processing as described above. Likewise, the decoder 732 may have a profile handling unit(s) 754 to receive extracted profile information, include the settings of the profile_tier_level syntax, that is at least relevant to the post-processing as described above, and to implement coding tools and algorithms that provide decoded data in conformance with a selected profile. It will be understood that the profile handling units 752 and 754 may not be a single module or unit but may include that code or programming spread throughout a number of units or modules but that is relevant to the use and control of the profile and the profile_tier_level syntax, and specifically the normative post-processing.

As will be appreciated, the modules illustrated in FIG. 7 may include a variety of software and/or hardware modules and/or modules that may be implemented via software or hardware or combinations thereof. For example, the modules may be implemented as software via processing units 720 or the modules may be implemented via a dedicated hardware portion. Furthermore, the shown memory stores 706 may be shared memory for processing units 720, for example. Image data, profile data, and other post-processing data may be stored on any of the options mentioned above, or may be stored on a combination of these options, or may be stored elsewhere. Also, system 700 may be implemented in a variety of ways. For example, system 700 (excluding display device 705) may be implemented as a single chip or device having a graphics processor, a quad-core central processing unit, and/or a memory controller input/output (I/O) module. In other examples, system 700 (again excluding display device 705) may be implemented as a chipset.

Processor(s) 703 may include any suitable implementation including, for example, microprocessor(s), multicore processors, application specific integrated circuits, chip(s), chipsets, programmable logic devices, graphics cards, integrated graphics, general purpose graphics processing unit(s), or the like. In addition, memory stores 706 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, a memory stores 704 also may be implemented via cache memory.

Figure 8:
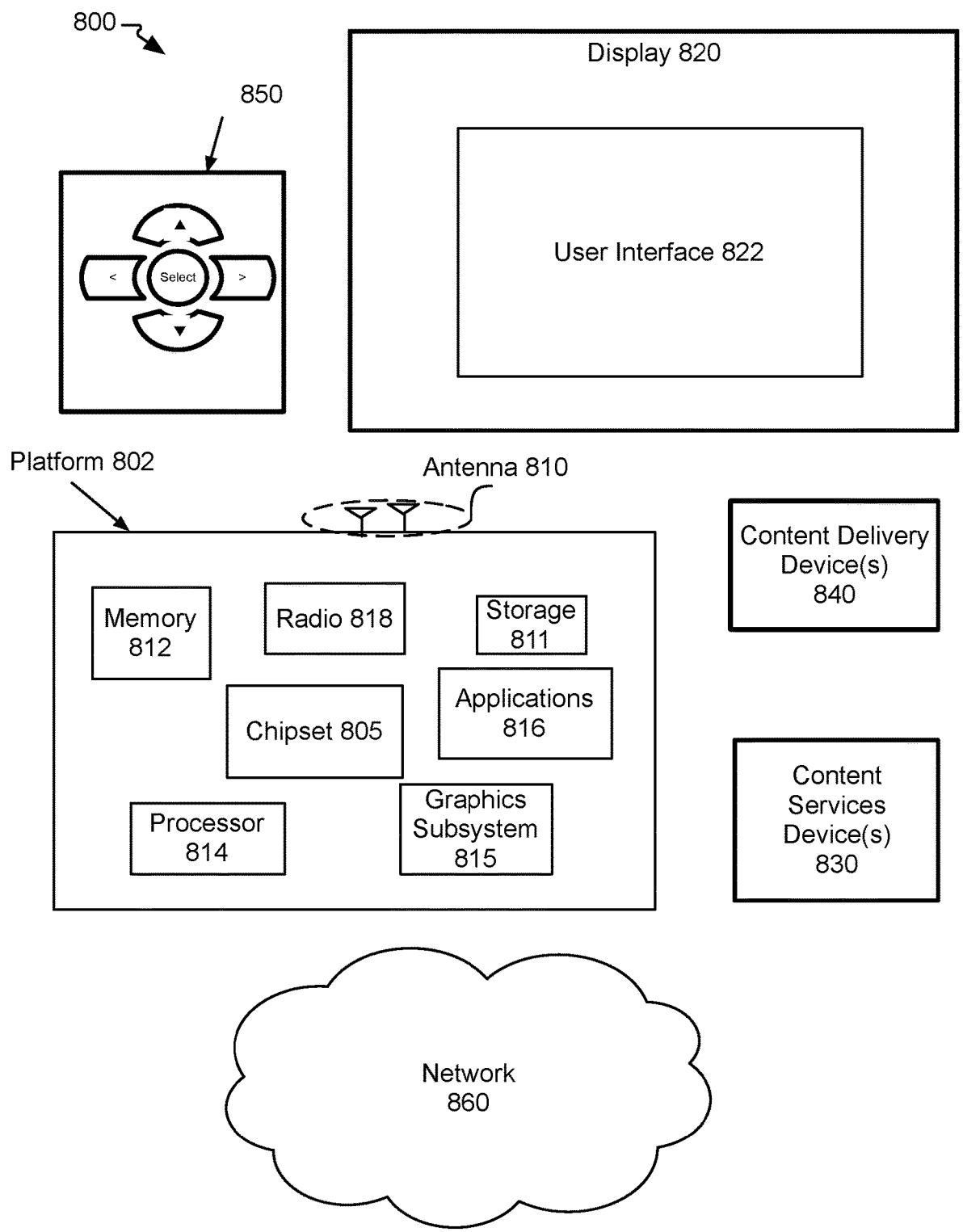
FIG. 8 is an illustrative diagram of another example system.

Referring to FIG. 8, an example system 800 in accordance with the present disclosure and various implementations, may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 800 includes a platform 802 communicatively coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 814, memory 812, storage 811, graphics subsystem 815, applications 816 and/or radio 818 as well as antenna(s) 810. Chipset 805 may provide intercommunication among processor 814, memory 812, storage 811, graphics subsystem 815, applications 816 and/or radio 818. For example, chipset 805 may include a storage adapter (not depicted) capable of providing intercommunication with storage 811.

Processor 814 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 811 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 811 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, Display Port, wireless HDMI, and/or wireless HD compliant techniques. Graphics subsystem 815 may be integrated into processor 814 or chipset 805. In some implementations, graphics subsystem 815 may be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In implementations, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In implementations, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various implementations, platform 802 and display 820 may be an integrated unit. Display 820 and content service device(s) 830 may be integrated, or display 820 and content delivery device(s) 840 may be integrated, for example. These examples are not meant to limit the present disclosure.

In various implementations, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 8.

Figure 9:
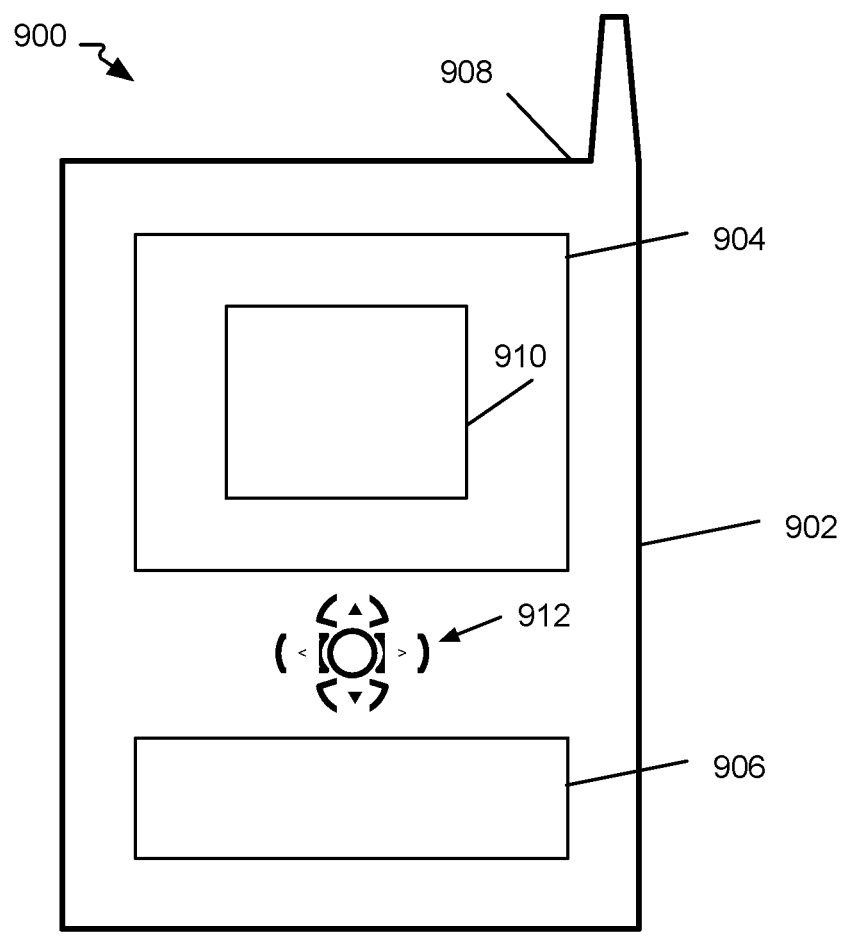
FIG. 9 illustrates another example device, all arranged in accordance with at least some implementations of the present disclosure.

As described above, system 700 or 800 may be implemented in varying physical styles or form factors. FIG. 9 illustrates implementations of a small form factor device 900 in which system 700 or 800 may be implemented. In implementations, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 9, device 900 may include a housing 902, a display 904, an input/output (I/O) device 906, and an antenna 908. Device 900 also may include navigation features 912. Display 904 may include any suitable screen 910 on a display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

By one example, a computer-implemented method of video coding with post-processing indication comprises obtaining image data; encoding the image data in conformance with a video coding profile having a profile_tier_level syntax comprising profile syntax elements indicating the conformance parameters of a video coding standard and for decoded video, wherein one of the profile syntax elements of the profile_tier_level syntax is a general context interpretation code that indicates that the image data is to be post-processed after decoding, and wherein the general context interpretation code is an existing profile syntax element originally established for reasons other than post-processing; and providing the image data and profile_tier_level syntax settings in a bitstream to be transmitted to a decoder to have the image data decoded, post-processed after the decoding depending on a setting of the general context interpretation code, and available to display images.

By another example of the method, the method also may include wherein the video coding profile is a high efficiency video coding (HEVC) profile and the general context interpretation code is the general_profile_space code; wherein the setting of the general context interpretation code is alternatively a first value to indicate decoding without required post-processing, a second value to indicate post-processing is necessary after decoding, and any other value to indicate decoding may be skipped for the image data; the method comprising setting the value of the general context interpretation code so that a decoder that does not have access to a type of post-processing expected by the use of the value of the profile code setting does not decode the image data, while a decoder that does have access to a type of post-processing expected by the use of the value does decode the image data; wherein the general context interpretation code has a plurality of values that indicate post-processing, and wherein individual values indicate a different type of post-processing or a combination of post-processing types; wherein the post-processing is related to at least one of: converting image data from standard dynamic range (SDR) to high dynamic range (HDR), converting YUV image data to RGB color space image data, and modifying the color temperature of the image data.

By yet another method, a computer-implemented method of video coding with post-processing indication comprises obtaining encoded image data and profile_tier_level syntax settings of a video coding profile and having profile syntax elements indicating the conformance parameters of a video coding standard and for decoded video, wherein one profile syntax element of the profile_tier_level syntax indicates that the image data is to be post-processed after decoding, and wherein the one profile syntax element is an existing profile syntax element originally established for reasons other than post-processing; decoding the encoded image data; and depending on the setting of the one profile syntax element, providing the decoded image data to be post-processed to use the post-processed image data to display images.

By this method, the method may further include wherein the one profile syntax element is a general context interpretation code; wherein the video coding profile is a high efficiency video coding (HEVC) profile and the one profile syntax element is the general_profile_space code; wherein the post-processing indicated by the one profile syntax element establishes normative post-processing to form a profile conformance point after the post-processing of image data; the method comprising: obtaining non-profile data that indicates at least one type of post-processing indicated by the profile code setting; and skipping the decoding of a video sequence at a decoder when a setting of the one profile syntax element indicates that the image data is to be post-processed but the decoder does not have capability to perform the post-processing indicated by the profile code setting.

In a further example, a computer-implemented system of video coding with post-processing indication comprises at least one memory; at least one display; at least one processor communicatively connected to the at least one display and at least one memory; and an encoder operated by the at least one processor and arranged to: obtain image data; encode the image data in conformance with a video coding profile having a profile_tier_level syntax comprising profile syntax elements indicating the conformance parameters of a video coding standard and for decoded video, wherein one of the profile syntax elements of the profile_tier_level syntax is a general context interpretation code that indicates that the image data is to be post-processed after decoding, and wherein the general context interpretation code is an existing profile syntax element originally established for reasons other than post-processing; and provide the image data and profile_tier_level syntax settings in a bitstream to be transmitted to a decoder to have the image data decoded, post-processed after the decoding depending on a setting of the general context interpretation code, and available to display images.

The system also may include that wherein the video coding profile is a high efficiency video coding (HEVC) profile and the general context interpretation code is the general_profile_space code; wherein the general context interpretation code is alternatively a first value to indicate decoding without required post-processing, at least one second value to indicate post-processing is necessary after decoding, and any other value to indicate decoding may be skipped for corresponding image data; wherein the general context interpretation code has a plurality of post-processing values wherein individual post-processing value indicate a different type of post-processing or a combination of post-processing types; wherein the post-processing indicated by the one profile syntax element establishes normative post-processing to form a profile conformance point after the post-processing of image data.

In another approach, a computer-readable medium having instructions thereon that when executed by a computing device cause the computing device to: obtain encoded image data and profile_tier_level syntax settings of a video coding profile and having profile syntax elements indicating the conformance parameters of a video coding standard and for decoded video, wherein one profile syntax element of the profile_tier_level syntax indicates that the image data is to be post-processed after decoding, and wherein the one profile syntax element is an existing profile syntax element originally established for reasons other than post-processing; decode the encoded image data; and depending on the setting of the one profile syntax element, provide the decoded image data to be post-processed to use the post-processed image data to display images.

The medium also may include wherein the video coding profile is a high efficiency video coding (HEVC) profile and the general context interpretation code is the general_profile_space code; wherein the setting of the general context interpretation code is alternatively a first value to indicate decoding without required post-processing, a second value to indicate post-processing is necessary after decoding, and any other value to indicate decoding may be skipped for the image data; the executed instructions cause the computing device to operate by setting the value of the general context interpretation code so that a decoder that does not have access to a type of post-processing expected by the use of the value of the profile code setting does not decode the image data, while a decoder that does have access to a type of post-processing expected by the use of the value does decode the image data; wherein the general context interpretation code has a plurality of values that indicate post-processing, and wherein individual values indicate a different type of post-processing or a combination of post-processing types; wherein the post-processing is related to at least one of: converting image data from standard dynamic range (SDR) to high dynamic range (HDR), converting YUV image data to RGB color space image data, and modifying the color temperature of the image data.

In another example, at least one machine readable medium may include a plurality of instructions that in response to being executed on a computing device, cause the computing device to perform the method according to any one of the above examples.

In yet another example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:
1. A computer-implemented method of video coding with post-processing indication comprising:
 obtaining image data of at least one image;
 encoding the image data in conformance with a video coding profile having a profile_tier_level syntax comprising profile syntax elements indicating conformance parameters of a video coding standard and for decoded video;
 using one of the profile syntax elements of the profile_tier_level syntax that is a general context interpretation code associated with alternative values and to indicate that the image is to be post-processed after decoding to modify the image data of the image to affect a display of the image, wherein a value of the general context interpretation code is one of three available alternatives of:
a first value to indicate decoding without required post-processing,
a second value to indicate post-processing is necessary after decoding, and
any other value to indicate decoding may be skipped for the image data, and
wherein the general context interpretation code is an existing profile syntax element originally established for reasons other than post-processing and used without modifying the video coding standard by adding codes for the post-processing; and
providing the image data and profile_tier_level syntax settings in a bitstream to be transmitted to a decoder to have the image data decoded, post-processed after decoding depending on a setting of the general context interpretation code, and available to display images.

2. The method of claim 1 wherein the video coding profile is a high efficiency video coding (HEVC) profile and the general context interpretation code is a general_profile_space code.

3. The method of claim 1 comprising setting a value of the general context interpretation code so that a decoder that does not have access to a type of post-processing expected by a use of a value of the profile code setting does not decode the image data, while a decoder that does have access to a type of post-processing expected by the use of the value of the profile code does decode the image data.

4. The method of claim 1 wherein the general context interpretation code has a plurality of values that indicate post-processing, and wherein individual values indicate a different type of post-processing or a combination of post-processing types.

5. The method of claim 1 wherein the post-processing is related to at least one of:
converting image data from standard dynamic range (SDR) to high dynamic range (HDR),
converting YUV image data to RGB color space image data, and
modifying a color temperature of the image data.

6. The method of claim 1 wherein the video coding profile is a high efficiency video coding (HEVC) profile and the general context interpretation code is a general_profile_space code;
the method comprising setting the value of the general context interpretation code so that a decoder that does not have access to a type of post-processing expected by a use of a value of the profile code setting does not decode the image data, while a decoder that does have access to a type of post-processing expected by the use of the profile code value does decode the image data;
wherein the general context interpretation code has a plurality of values that indicate post-processing, and wherein individual values indicate a different type of post-processing or a combination of post-processing types;
wherein the post-processing is related to at least one of:
converting image data from standard dynamic range (SDR) to high dynamic range (HDR),
converting YUV image data to RGB color space image data, and
modifying a color temperature of the image data.

7. A computer-implemented method of video coding with post-processing indication comprising:

obtaining encoded image data of at least one image and profile_tier_level syntax settings of a video coding profile and having profile syntax elements indicating conformance parameters of a video coding standard and for decoded video;
using one profile syntax element of the profile_tier_level syntax to indicate that the image is to be post-processed after decoding to modify the image data of the image to affect a display of the image, wherein a value of the general context interpretation code is one of three available alternatives of:
a first value to indicate decoding without required post-processing,
a second value to indicate post-processing is necessary after decoding, and
any other value to indicate decoding may be skipped for the image data, and
wherein the one profile syntax element is an existing profile syntax element that is a single code associated with alternative values and originally established for reasons other than post-processing and used without modifying the video coding standard by adding codes for the post-processing;
decoding the encoded image data to generate decoded image data; and
depending on the setting of the one profile syntax element, providing the decoded image data to be post-processed to use post-processed image data to display images.

8. The method of claim 7 wherein the one profile syntax element is a general context interpretation code.

9. The method of claim 7 wherein the video coding profile is a high efficiency video coding (HEVC) profile and the one profile syntax element is a general_profile_space code.

10. The method of claim 7 wherein the post-processing indicated by the one profile syntax element establishes normative post-processing to form a profile conformance point after the post-processing of image data.

11. The method of claim 7 comprising obtaining non-profile data that indicates at least one type of post-processing indicated by the profile code setting.

12. The method of claim 7 comprising skipping the decoding of a video sequence at a decoder when a setting of the one profile syntax element indicates that the image data is to be post-processed but the decoder does not have capability to perform the post-processing indicated by the profile code setting.

13. The method of claim 7 wherein the one profile syntax element is a general context interpretation code;
wherein the video coding profile is a high efficiency video coding (HEVC) profile and the one profile syntax element is a general_profile_space code;
wherein the post-processing indicated by the one profile syntax element establishes normative post-processing to form a profile conformance point after the post-processing of image data;
the method comprising: obtaining non-profile data that indicates at least one type of post-processing indicated by a profile code setting; and
skipping the decoding of a video sequence at a decoder when a setting of the one profile syntax element indicates that the image data is to be post-processed but the decoder does not have capability to perform the post-processing indicated by the profile code setting.

14. A computer-implemented system of video coding with post-processing indication comprising:
at least one memory;
at least one display;

at least one processor communicatively connected to the at least one display and at least one memory; and an encoder operated by the at least one processor and arranged to:

obtain image data of at least one image;

encode the image data in conformance with a video coding profile having a profile_tier_level syntax comprising profile syntax elements indicating conformance parameters of a video coding standard and for decoded video;

using one of the profile syntax elements of the profile_tier_level syntax that is a general context interpretation code associated with alternative values and to indicate that the image is to be post-processed after decoding to modify the image data of the image to affect a display of the image, wherein a value of the general context interpretation code is one of three available alternatives of:

a first value to indicate decoding without required post-processing, a second value to indicate post-processing is necessary after decoding, and any other value to indicate decoding may be skipped for the image data, and wherein the general context interpretation code is an existing profile syntax element originally established for reasons other than post-processing and used without modifying the video coding standard by adding codes for the post-processing; and provide the image data and profile_tier_level syntax settings in a bitstream to be transmitted to a decoder to have the image data decoded, post-processed after decoding depending on a setting of the general context interpretation code, and available to display images.

15. The system of claim 14 wherein the video coding profile is a high efficiency video coding (HEVC) profile and the general context interpretation code is a general_profile_space code.

16. The system of claim 14 wherein the general context interpretation code has a plurality of post-processing values wherein individual post-processing value indicate a different type of post-processing or a combination of post-processing types.

17. The system of claim 14 wherein the post-processing indicated by the one profile syntax element establishes normative post-processing to form a profile conformance point after the post-processing of image data.

18. The system of claim 14 wherein the video coding profile is a high efficiency video coding (HEVC) profile and the general context interpretation code is a general_profile_space code;

wherein the general context interpretation code has a plurality of post-processing values wherein individual post-processing value indicate a different type of post-processing or a combination of post-processing types;

wherein the post-processing indicated by the one profile syntax element establishes normative post-processing to form a profile conformance point after the post-processing of image data.

19. A non-transitory computer-readable medium having instructions thereon that when executed by a computing device cause the computing device to:

obtain encoded image data of at least one image and profile_tier_level syntax settings of a video coding profile and having profile syntax elements indicating conformance parameters of a video coding standard and for decoded video;

using one profile syntax element of the profile_tier_level syntax to indicate that the image is to be post-processed after decoding to modify the image data of the image to affect a display of the image, wherein a value of the general context interpretation code is one of three available alternatives of:

a first value to indicate decoding without required post-processing, a second value to indicate post-processing is necessary after decoding, and any other value to indicate decoding may be skipped for the image data, and wherein the one profile syntax element is an existing profile syntax element that is a single code associated with alternative values and originally established for reasons other than post-processing and used without modifying the video coding standard by adding codes for the post-processing;

decode the encoded image data; and depending on the setting of the one profile syntax element, provide decoded image data to be post-processed to use the post-processed image data to display images.

20. The medium of claim 19 wherein the one profile syntax element is a general context interpretation code.

21. The medium of claim 19 wherein the video coding profile is a high efficiency video coding (HEVC) profile and the one profile syntax element is a general_profile_space code.

22. The medium of claim 19 wherein the post-processing indicated by the profile syntax element establishes normative post-processing to form a profile conformance point after the post-processing of image data.

23. The medium of claim 19 wherein the video coding profile is a high efficiency video coding (HEVC) profile and the general context interpretation code is a general_profile_space code;

the executed instructions cause the computing device to operate by setting a value of the general context interpretation code so that a decoder that does not have access to a type of post-processing expected by a use of a value of a profile code setting does not decode the image data, while a decoder that does have access to a type of post-processing expected by the use of the value of the profile code setting does decode the image data;

wherein the general context interpretation code has a plurality of values that indicate post-processing, and wherein individual values indicate a different type of post-processing or a combination of post-processing types;

wherein the post-processing is related to at least one of:

converting image data from standard dynamic range (SDR) to high dynamic range (HDR), converting YUV image data to RGB color space image data, and modifying a color temperature of the image data.

* * * * *